United States Patent
Li et al.

(10) Patent No.: US 10,885,100 B2
(45) Date of Patent: Jan. 5, 2021

(54) THUMBNAIL-BASED IMAGE SHARING METHOD AND TERMINAL

(71) Applicant: Huawei Technologies Co., Ltd., Shenzhen (CN)

(72) Inventors: Yu Li, Beijing (CN); Changqi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 16/277,063

(22) Filed: Feb. 15, 2019

(65) Prior Publication Data

US 2019/0188222 A1    Jun. 20, 2019

Related U.S. Application Data

(63) Continuation of application No. PCT/CN2017/070656, filed on Jan. 9, 2017.

(30) Foreign Application Priority Data

Aug. 15, 2016  (CN) .......................... 2016 1 0671030

(51) Int. Cl.
  *G06F 16/54*   (2019.01)
  *G06F 16/583*  (2019.01)
  (Continued)

(52) U.S. Cl.
  CPC .............. *G06F 16/54* (2019.01); *G06F 16/00* (2019.01); *G06F 16/51* (2019.01); *G06F 16/583* (2019.01); *G06F 16/5854* (2019.01)

(58) Field of Classification Search
  CPC ........ G06F 16/54; G06F 16/583; G06F 16/50; G06F 16/55; G06F 16/5838; G06F 16/40;
  (Continued)

(56) References Cited

U.S. PATENT DOCUMENTS 6,247,009 B1 * 6/2001 Shiiyama ................ G06F 16/58
6,430,566 B1 * 8/2002 Shiiyama ................ G06F 16/58
                                                        382/276
(Continued)

FOREIGN PATENT DOCUMENTS

CN         1860788 A    11/2006
CN       101211341 A     7/2008
(Continued)

OTHER PUBLICATIONS

Machine Translation and Abstract of Chinese Publication No. CN101211341, Jul. 2, 2008, 9 pages.
(Continued)

*Primary Examiner* — Jingge Wu
(74) *Attorney, Agent, or Firm* — Conley Rose, P.C.

(57) ABSTRACT

A thumbnail-based image display method and terminal, where the method includes displaying a thumbnail on a screen, performing feature extraction on the thumbnail to obtain a feature factor of the thumbnail, displaying prompt information on the screen when the feature factor of the thumbnail is matched with a feature factor in a feature factor index library, where the feature factor index library indicates correspondences among feature factors and image storage addresses, obtaining an original image obtaining request, and displaying the original image on the screen based on the original image obtaining request. According to the method and terminal, feature indexes are created for all images in memories and buffers of all applications and in an image library, and an original high-resolution image is found using a feature factor of a thumbnail, thereby implementing high-definition image sharing between different applications.

20 Claims, 10 Drawing Sheets

(51) Int. Cl.
*G06F 16/00* (2019.01)
*G06F 16/51* (2019.01)

(58) Field of Classification Search
CPC ........ G06F 16/748; G06F 16/94; G06F 16/51; G06F 16/5854; G06F 16/58; G06K 2209/25; G06K 9/00684; G06K 9/6255; H04N 5/23238; H04N 5/262
See application file for complete search history.

(56) References Cited

U.S. PATENT DOCUMENTS

| | | | | |
|---|---|---|---|---|
| 7,760,249 | B2 * | 7/2010 | Tsujiuchi | G06F 16/583 348/231.99 |
| 2004/0125121 | A1 * | 7/2004 | Pea | G11B 27/034 715/716 |
| 2004/0125133 | A1 * | 7/2004 | Pea | G06F 16/40 715/751 |
| 2004/0125148 | A1 * | 7/2004 | Pea | H04N 5/23238 715/802 |
| 2005/0052685 | A1 * | 3/2005 | Herf | H04N 1/00217 358/1.15 |
| 2006/0285172 | A1 * | 12/2006 | Hull | G06F 16/583 358/448 |
| 2008/0247677 | A1 * | 10/2008 | Yoshino | H04N 1/6033 382/305 |
| 2008/0304753 | A1 * | 12/2008 | Sohma | G06K 9/4604 382/218 |
| 2009/0063431 | A1 * | 3/2009 | Erol | G06K 9/6293 |
| 2009/0100048 | A1 * | 4/2009 | Hull | G06F 16/955 |
| 2009/0310863 | A1 * | 12/2009 | Gallagher | G06K 9/00221 382/182 |
| 2013/0104053 | A1 | 4/2013 | Thornton et al. | |
| 2013/0239063 | A1 * | 9/2013 | Ubillos | G06K 9/4652 715/838 |
| 2015/0104114 | A1 | 4/2015 | Bai et al. | |
| 2015/0169177 | A1 * | 6/2015 | Zhao | G06F 16/583 715/838 |
| 2015/0254514 | A1 * | 9/2015 | Oami | G06K 9/00771 707/722 |
| 2015/0347464 | A1 * | 12/2015 | Takata | G16H 50/70 707/728 |
| 2016/0125162 | A1 * | 5/2016 | Takata | G06F 19/321 705/2 |
| 2016/0232402 | A1 | 8/2016 | Jiang et al. | |
| 2016/0247300 | A1 * | 8/2016 | Takata | G06F 16/5854 |

FOREIGN PATENT DOCUMENTS

| | | |
|---|---|---|
| CN | 101308503 A | 11/2008 |
| CN | 101556611 A | 10/2009 |
| CN | 102238107 A | 11/2011 |
| CN | 102402603 A | 4/2012 |
| CN | 102521257 A | 6/2012 |
| CN | 103179156 A | 6/2013 |
| CN | 103312757 A | 9/2013 |
| CN | 103544251 A | 1/2014 |
| CN | 104572732 A | 4/2015 |
| CN | 104737158 A | 6/2015 |
| CN | 104881296 A | 9/2015 |
| CN | 106294798 A | 1/2017 |

OTHER PUBLICATIONS

Machine Translation and Abstract of Chinese Publication No. CN101556611, Oct. 14, 2009, 5 pages.
Machine Translation and Abstract of Chinese Publication No. CN102402603, Apr. 4, 2012, 24 pages.
Machine Translation and Abstract of Chinese Publication No. CN102521257, Part 1, Jun. 27, 2012, 29 pages.
Machine Translation and Abstract of Chinese Publication No. CN102521257, Part 2, Jun. 27, 2012, 10 pages.
Machine Translation and Abstract of Chinese Publication No. CN103179156, Jun. 26, 2013, 16 pages.
Machine Translation and Abstract of Chinese Publication No. CN103312757, Sep. 18, 2013, 17 pages.
Machine Translation and Abstract of Chinese Publication No. CN104737158, Jun. 24, 2015, 51 pages.
Machine Translation and Abstract of Chinese Publication No. CN104881296, Sep. 2, 2015, 16 pages.
Machine Translation and Abstract of Chinese Publication No. CN106294798, Jan. 4, 2017, 36 pages.
Foreign Communication From A Counterpart Application, Chinese Application No. 201610671030.4, Chinese Office Action dated Jan. 11, 2019, 10 pages.
Foreign Communication From A Counterpart Application, Chinese Application No. 201610671030.4, Chinese Search Report dated Jan. 2, 2019, 2 pages.
Foreign Communication From A Counterpart Application, PCT Application No. PCT/CN2017/070656, English Translation of International Search Report dated May 3, 2017, 2 pages.
Foreign Communication From A Counterpart Application, PCT Application No. PCT/CN2017/070656, English Translation of Written Opinion dated May 3, 2017, 5 pages.

* cited by examiner

| Image feature factor | Image storage location |
|---|---|
| 00 04 c8 42 c8 42  02 00 00 c8 42 01 04 c8 42<br>00 00 00 00 01 c8 42 01 02 c8 42  02 04  c8 42<br>02 00 c8 42 02 02  c8 42 ... | /storage/emulated/0/DCIM/image90/pp0.png |
| 03 04 c8 42  03 c8 42 03 02 c8 42 04 04 c8 42<br>04 00 c8 42 04 02 c8 42 05 04 c8 42 05 00 c8 42<br>05 02 00 00 00 00 c8 42 00 00 00 00 06 ... | /storage/emulated/0/DCIM/image90/pp1.png |
| Image feature binary character string | /storage/emulated/0/DCIM/image90/pp2.jpg |

FIG. 6

THUMBNAIL-BASED IMAGE SHARING METHOD AND TERMINAL

CROSS-REFERENCE TO RELATED APPLICATIONS

This application is a continuation of International Patent Application No. PCT/CN2017/070656 filed on Jan. 9, 2017, which claims priority to Chinese Patent Application No. 201610671030.4 filed on Aug. 15, 2016. The disclosures of the aforementioned applications are hereby incorporated by reference in their entireties.

TECHNICAL FIELD

The present disclosure relates to the field of media image processing, and in particular to a method and a terminal for thumbnail-based image sharing between different applications.

BACKGROUND

Image retrieval is retrieving related graphical image materials by searching for image texts or visual features. Image retrieval may be performed in the following manners, performing image retrieval by entering a keyword similar to a name or content of an image, performing image retrieval through speech recognition, and performing retrieval by uploading an image or a hyperlink pointing to an image.

In image retrieval technologies, a server or a client that performs actual retrieval may establish index information for an image. For example, the index information may be established through image analysis and identification, by adding a comment to the image, or the like. Then, an index library is established based on the index information.

In the image retrieval technologies, main retrieval manners are as follows.

Based on external information of an image: Retrieval is performed based on external information such as a file name or a directory name, a path name, and a link of an image, an image attribute tag, and text information around the image. This is a method most frequently used by current image search engines. After an image file is found, the image search engine determines file content by viewing a file name or a path name. However, this depends on a description degree of the file name or the path name.

Based on descriptions of image content features: This is semantic level matching. People need to describe and classify image content (such as an object, a background, composition, and a color feature), and provide description words. During retrieval, the description words are mainly searched for a retrieval word. This query manner is relatively precise. Usually, a relatively good precision rate may be obtained. However, people participation is required and labor intensity is high. Therefore, a quantity of images that can be processed is limited, and a specification and a standard are required. An effect depends on precision of description by people.

Based on an image form feature: Features such as a color, a shape, and a texture of an image are extracted, and a feature index library is established. A user only needs to describe a rough feature of a to-be-found image to find an image that has a feature similar to the feature of the to-be-found image. This is image feature level-based mechanical matching, and is particularly applicable to a query requirement for retrieving an explicit object (for example, trademark retrieval).

In a broad sense, an image feature includes two types, namely, a text-based feature (such as a keyword or a comment) and a visual-based feature (such as a color, a texture, or a shape). The visual feature may alternatively be classified into a universal visual feature and a field-related (local/dedicated) visual feature. The former is used to describe a common feature of all images, is unrelated to a specific type or content of an image, and mainly includes a color, a texture, and a shape. The latter is based on priori knowledge (or assumption) of described image content and is closely related to a specific application, for example, a facial feature or a fingerprint feature of a person.

In an implementation, an image is scaled into images of a plurality of scales, then image features are extracted at different scale layers, an index is established, and then feature comparison is performed after the image features are indexed.

Image feature-based image retrieval may be implemented in the following manners.

(1) Based on an "information fingerprint": A used key technology is referred to as a perceptual hash algorithm. A function of the technology is generating a fingerprint character string for each image, and then fingerprints of different images are compared. The closer fingerprints of different images, the more similar the images are.

(2) Based on a color feature: Mainly, each image is converted into a color distribution histogram. The higher similarity between histograms of two images, the more similar the two images are.

(3) Thresholding image segmentation: An original image is first converted into a relatively small gray-scale image, and a threshold is determined to convert the gray-scale image into a black and white image. The more similar outlines of two black and white images, the more similar original images are.

(4) Deep learning: Semantic identification is performed on images in a deep learning manner, and a similarity between the images is determined based on a semantic identification result. In the deep learning, a feature of an image is extracted by mainly using a deep convolution neural network.

A thumbnail represents a smaller image obtained by performing compression processing on an image on a web page or in a computer. The thumbnail is usually attached with a hyperlink pointing to an original image. The thumbnail may be used for more rapidly loading a web page with a relatively large quantity of graphs or images in a browser, or may be used for image previewing during image sharing. The thumbnail is small and a loading speed of the thumbnail is very fast. Therefore, the thumbnail is used for rapid browsing and mainly plays a role of image file previewing and a directory. If another user has an interest in the thumbnail, the other user may obtain an original image using a link corresponding to the thumbnail. Transmission bandwidth may be saved using a thumbnail in an environment such that after previewing an original image, a user can decide whether to download the original image.

In an implementation of image sharing using a thumbnail, as shown in FIG. 1, a terminal 1 (which may be a device such as a smartphone, a notebook computer, a desktop computer, or a tablet computer) stores an original image A. If a user of terminal 1 intends to share the image A with another user when using an application A, where the application A herein may be an email, social software, image processing software, or the like, the application A first generates a thumbnail a of the image A, and then sends the thumbnail a and an original image download link to a user of a terminal 2 using a same application A. After obtaining the thumbnail a, the user of the terminal 2 clicks the original image download link. After receiving an original image download request sent by the user of the terminal 2, a server downloads the original image corresponding to the link, and sends the original image A to the user of the terminal 2.

A main disadvantage of the foregoing solution is that, use of a high-definition image and a thumbnail is limited in a single application. However, if cross-application image sharing needs to be performed, only a thumbnail or an original image can be shared, and another application cannot obtain the original image using the thumbnail. Therefore, in the other approaches, image resource sharing with another application cannot be implemented.

SUMMARY

To resolve a cross-application image sharing problem, in the present disclosure, at an operating system layer, feature factor indexes are created for all images in memories and buffers of all applications and in an image library, and an original high-resolution image is found using a feature factor of a thumbnail, thereby implementing cross-application image sharing in a mobile phone.

According to a first aspect, an embodiment of the present disclosure provides a thumbnail-based image display method. The method includes displaying a thumbnail on a screen, performing feature extraction on the thumbnail to obtain a feature factor of the thumbnail, displaying prompt information on the screen when the feature factor of the thumbnail is matched with a feature factor in a feature factor index library, where the feature factor index library indicates correspondences among feature factors and image storage addresses, and the prompt information indicates that an original image matching the thumbnail exists, obtaining an original image obtaining request, and displaying the original image on the screen based on the original image obtaining request.

According to a second aspect, an embodiment of the present disclosure discloses an image display terminal. The terminal includes a display screen configured to display a thumbnail, a processor coupled to the display screen and configured to perform feature extraction on the thumbnail to obtain a feature factor of the thumbnail, and determine that the feature factor of the thumbnail is matched with a feature factor in a feature factor index library, where the display screen is further configured to display prompt information, where the prompt information indicates that an original image matching the thumbnail exists, and display the original image, and a storage coupled to the processor and configured to store the feature factor index library and the original image, where the feature factor index library indicates correspondences among feature factors and image storage addresses.

According to a third aspect, an embodiment of the present disclosure discloses a thumbnail-based image display method, where the method includes obtaining, using a system program, an original image obtaining request received from an application, where the system program and the application are run on a same terminal, obtaining a thumbnail based on the original image obtaining request, performing feature extraction on the thumbnail to obtain a feature factor of the thumbnail, obtaining, based on the feature factor of the thumbnail and a feature factor index library, an original image corresponding to the thumbnail, where the feature factor index library indicates correspondences among feature factors and image storage addresses, and sending the original image to the application.

According to a fourth aspect, an embodiment of the present disclosure discloses a thumbnail-based image display terminal, including a receiver configured to receive an original image obtaining request from another terminal; and a processor coupled to the receiver and configured to obtain a thumbnail based on the original image obtaining request, perform feature extraction on the thumbnail to obtain a feature factor of the thumbnail, obtain, based on the feature factor of the thumbnail and a feature factor index library, an original image corresponding to the thumbnail, where the feature factor index library indicates correspondences among feature factors and image storage addresses.

BRIEF DESCRIPTION OF DRAWINGS

To describe the technical solutions in some of the embodiments of the present disclosure more clearly, the following briefly describes the accompanying drawings describing the embodiments. The accompanying drawings in the following description show merely some embodiments of the present disclosure, and a person of ordinary skill in the art may derive other drawings from these accompanying drawings without creative efforts.

FIG. 6 is a schematic structural diagram of an index library according to an embodiment of the present disclosure;

DESCRIPTION OF EMBODIMENTS

Figure 1:
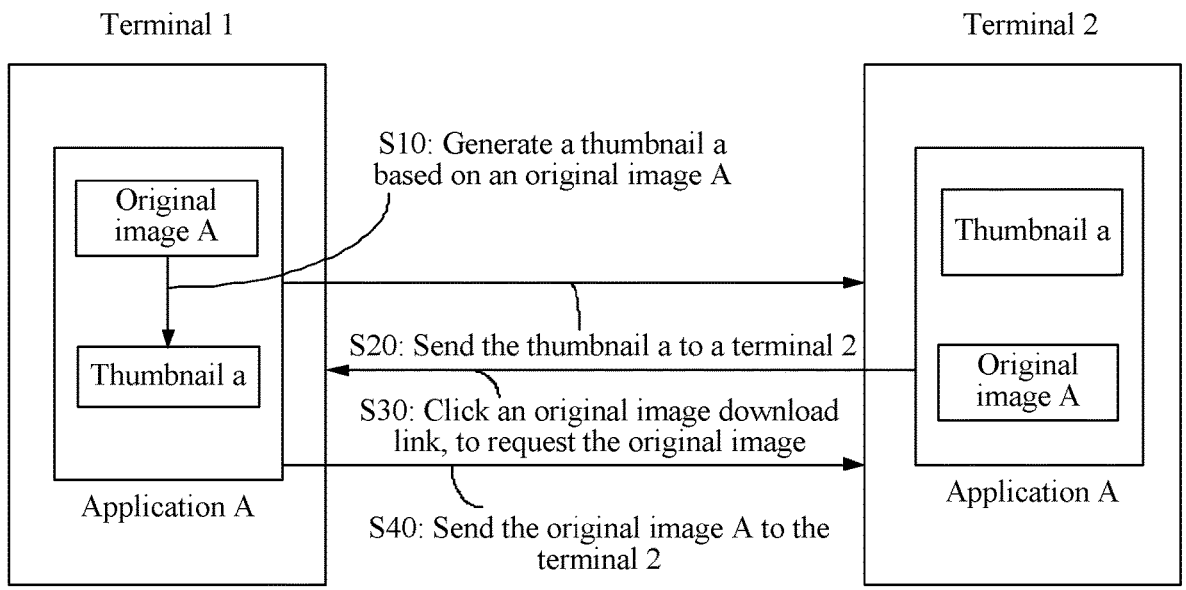
FIG. 1 is a schematic diagram of implementing image display using a thumbnail in a single application.
Figure 2:
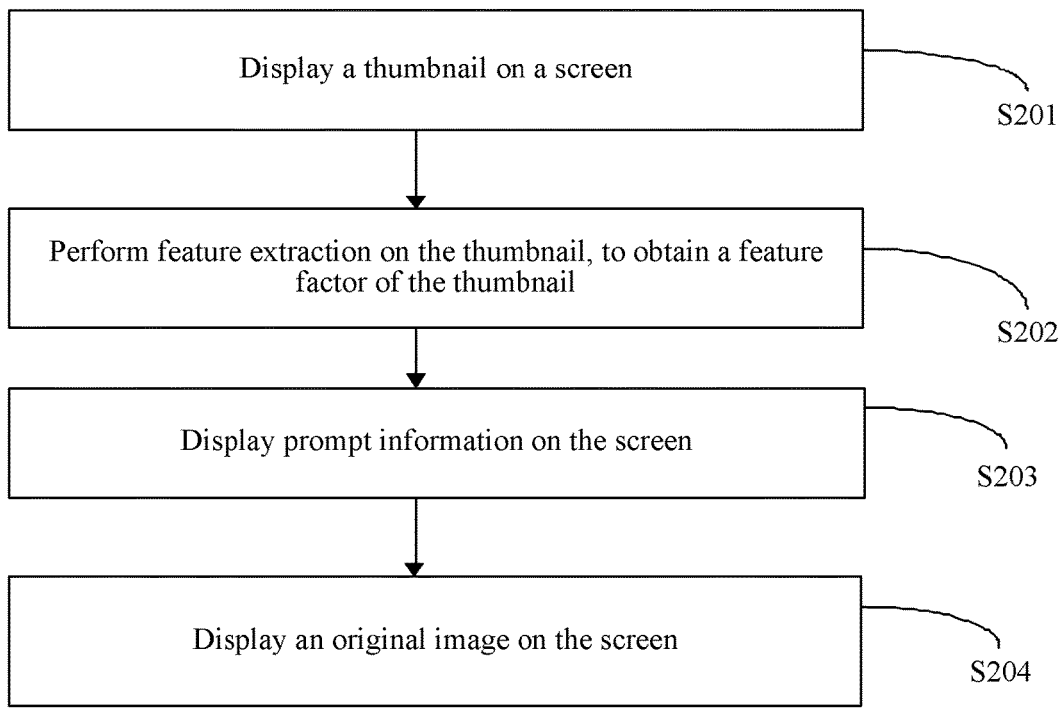
FIG. 2 is a flowchart of a thumbnail-based image display method according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An embodiment of the first aspect of the present disclosure discloses a thumbnail-based image display method. The method includes the following steps.

Step S201: Display a thumbnail on a screen.

The thumbnail is displayed on the screen of a terminal, and the thumbnail may be an image obtained through down-sampling or cutting processing on a high-resolution image.

The terminal in this embodiment of the present disclosure may be a device such as a smartphone, a notebook computer, or a tablet computer.

In a possible implementation of the present disclosure, a storage of the terminal is accessed using an application such that the thumbnail is displayed on the screen. The application may be an image viewer, image editing software, social software, or the like.

The storage in this embodiment of the present disclosure includes a storage manner such as a buffer, a memory, and a hard disk storage.

In an implementation of the present disclosure, the application may be a network program run on the terminal.

An image format of the image described in this embodiment of the present disclosure may be Joint Photographic Experts Group (JPEG), Tagged Image File Format (TIFF), raw, bitmap (BMP), Graphic Interchange Format (GIF), Portable Network Graphics (PNG), or the like. The thumbnail is one type of an image.

In an implementation of the present disclosure, before step S201, the method further includes obtaining an original image, performing feature extraction on the original image to obtain a feature factor of the original image, and updating an initial feature factor index library based on the feature factor of the original image to obtain a preset feature factor index library.

In a possible implementation of the present disclosure, the original image is obtained. An original high-definition image may be obtained through capturing using a camera. Alternatively, an original high-definition image may be obtained through downloading from a server or another terminal using a wireless network (such as WI-FI, third generation (3G) network transmission, or fourth generation (4G) network transmission) or a wired network (such as an optical fiber). Alternatively, an original high-definition image may be obtained from another terminal through BLUETOOTH, near field communication (NFC), or the like.

In a possible implementation of the present disclosure, the feature factor index library is updated by adding an index item.

In a possible implementation of the present disclosure, the index library is automatically established and updated. For example, the terminal may choose to update the index library at a fixed time (twelve o'clock every night) or a fixed period (every two weeks), or may update the index library when being triggered by an event (for example, a mobile phone is asleep). An update manner includes index item addition, index item update, and index item deletion. An object of the index item addition is a newly stored image within an update period, an object of the index item update is an image whose storage location is changed within the update period, and an object of the index item deletion is an image removed from the terminal within the update period. Because the update of the index library requires consumption of a system calculation resource. In a possible manner, the index library may be updated in a combined manner of the time manner and the event triggering manner. For example, after twelve o'clock at night, the terminal updates the index library only when the terminal is in a sleep state. This update manner does not affect normal use of the terminal by a user.

In a possible implementation of the present disclosure, a user autonomously chooses to establish and update the index library. In this manner, the user may select an update time and an update range (for example, which applications are selected to be updated) for the index library based on a requirement. It should be noted that the foregoing two update manners (automatic system update and manual user update) may be used together and do not conflict with each other, and simultaneous use of the two update manners can improve processing flexibility.

In a possible implementation of the present disclosure, resolution of the original image is compared with a threshold first, and when the resolution of the image is not less than or is equal to a preset threshold, an index is established for the image. When resolution of the image is less than the threshold, no index is established for the image. For some images with relatively low resolution, a visual quality difference between the original image and the thumbnail is not very large such that an index of the original image may not need to be established, thereby saving calculation resources. The preset threshold may be 300 pixels, 400 pixels, 450 pixels, or the like.

Step S202: Perform feature extraction on the thumbnail to obtain a feature factor of the thumbnail.

In an implementation of the present disclosure, the feature factor includes a color feature, a texture feature, a shape feature, or a spatial relationship feature.

There are a lot of algorithms of calculating a feature factor of an image. The algorithms may be, for example, an ORiented Brief (ORB) feature, a Scale-invariant feature transform (SIFT) descriptor, a fingerprint algorithm function, a bundling features algorithm, a hash function, and a deep network feature. Alternatively, an image feature may be extracted by designing different algorithms based on different images, for example, an image local N-order moment method.

It may be understood that a person of ordinary skill in the art may extract an image feature of the thumbnail using another algorithm.

Step S203: Display prompt information on the screen.

If the feature factor of the thumbnail is matched with a feature factor in the preset feature factor index library, the prompt information is displayed on the screen. The feature factor index library indicates correspondences between feature factors and image storage addresses, and the prompt information indicates that an original image matching the thumbnail exists.

In an implementation of the present disclosure, the feature factor index library may be in a form of a tablet, as shown in FIG. 6.

Figure 11:
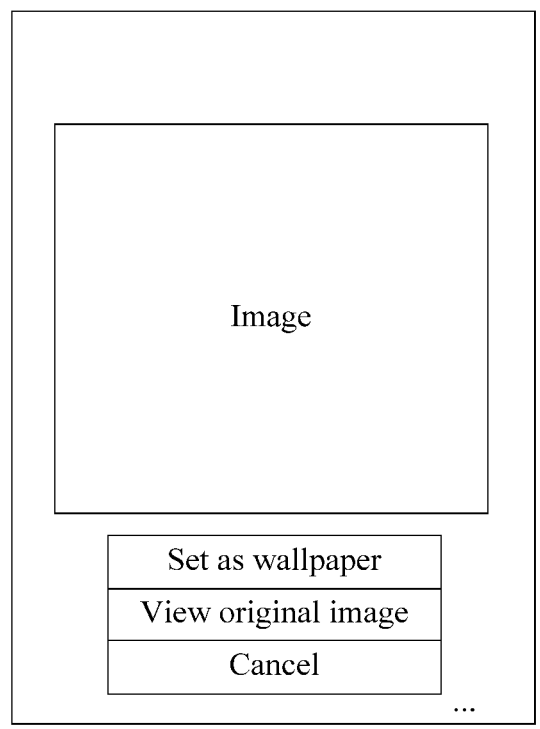
FIG. 11 is a schematic diagram of prompt information according to an embodiment of the present disclosure.

In an implementation of the present disclosure, as shown in FIG. 11, the prompt information is "View original image" in FIG. 11.

In an implementation of the present disclosure, that the feature factor of the thumbnail is matched with a feature factor in the preset feature factor index library includes calculating a similarity value between the feature factor of the thumbnail and each feature factor in the feature factor index library, where if at least one of all the similarity values is not less than the preset threshold, the feature factor of the thumbnail is matched with the feature factor in the preset feature factor index library.

In this embodiment of the present disclosure, a method provided in the other approaches may be used to calculate the similarity value between feature factors after the feature factor of the thumbnail is extracted. In a possible implementation, a Euclidean distance that can use a key point feature vector may be calculated as a similarity value between key points in two images.

In a possible implementation of the present disclosure, global or local similarity calculation is performed in the index library using an index value of the thumbnail, a threshold is set based on required robustness, then images with high similarities are pre-stored, and then an optimal matching image is sifted out as the original image.

In an implementation of the present disclosure, different preset thresholds may be set based on different feature extraction algorithms and different similarity value calculation methods.

In an implementation of the present disclosure, the method further includes obtaining an original image obtaining request. For example, in an example shown in FIG. 11, if a user clicks "View original image," response information received by the terminal is the original image obtaining request.

In this embodiment of the present disclosure, processing such as extraction of the feature factor of the thumbnail and matching of the feature factor index library is performed using a system process. The system process may access buffers or memories of a plurality of different applications, thereby implementing cross-application image sharing.

Step S204: Display an original image on the screen.

After receiving the original image obtaining request, the terminal displays the original image.

In a possible implementation, a processor accesses a storage address of the original image and displays the original image, only after the user clicks "View original image".

In a possible implementation, after obtaining a target feature factor, the processor accesses the storage address of the original image, but do not display the image. The processor displays the original image only after the user clicks "View original image".

In a possible implementation of the present disclosure, in all the similarity values not less than the preset threshold, a feature factor corresponding to a largest similarity value is the target feature factor, and the target feature factor is in the preset feature factor index library.

In this embodiment of the present disclosure, after the original image is displayed on the screen, another operation such as editing or sharing on the original image may be performed.

According to the image sharing method in this embodiment of the present disclosure, indexes are established for images in memories and buffers of all applications and in an image library in a mobile phone such that cross-application image display can be implemented, thereby overcoming a limitation in the other approaches that a high-definition image can be shared only in a buffer or a memory of a single application. Further, an original high-definition image whose image content is the same as or similar to that of a thumbnail may be found using the thumbnail, thereby viewing, editing, and sharing the original high-definition image.

Figure 3:
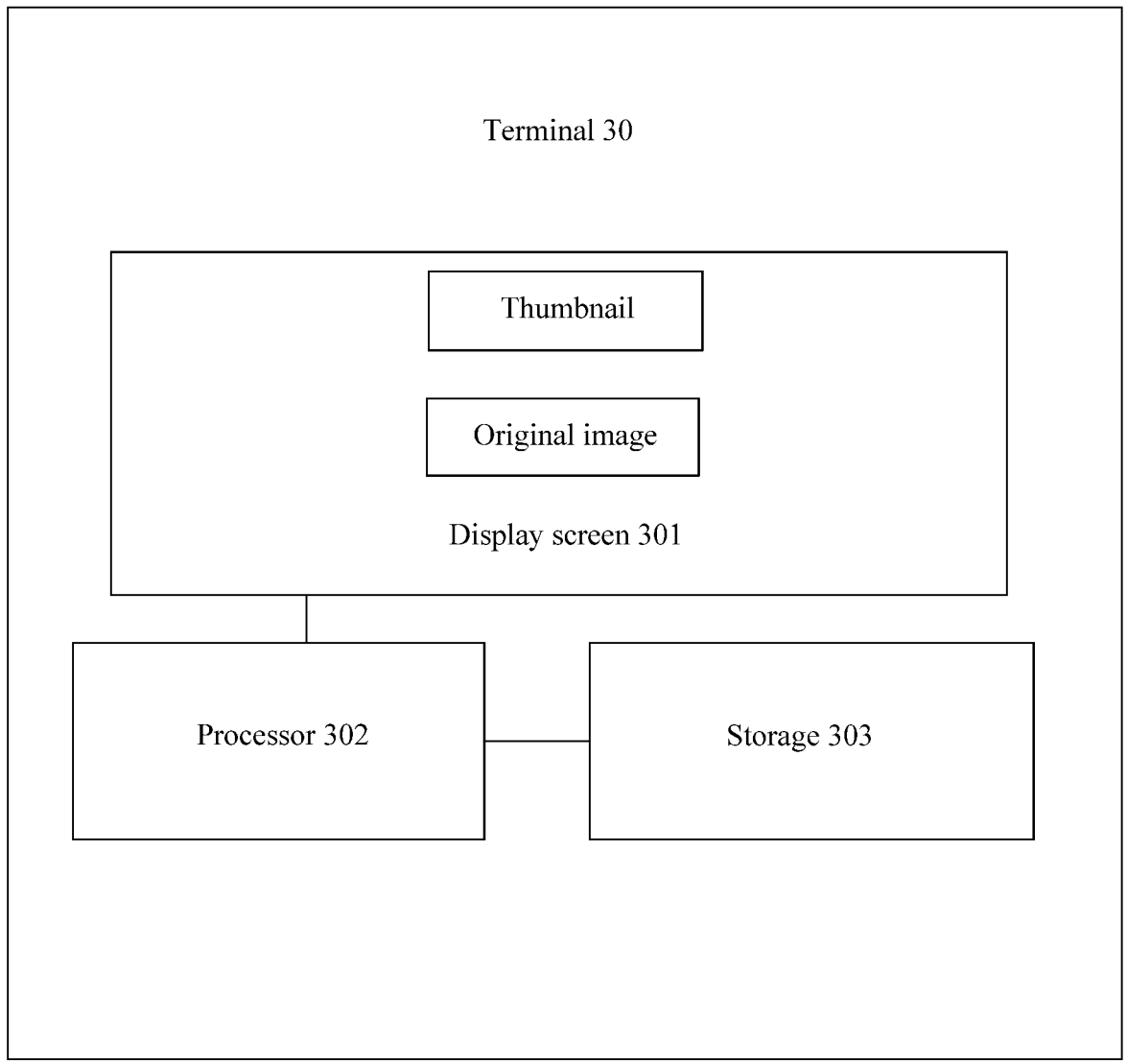
FIG. 3 is a schematic structural diagram of an image display terminal according to an embodiment of the present disclosure.

As shown in FIG. 3, an embodiment of the second aspect of the present disclosure discloses an image display terminal 30. The terminal 30 includes a display screen 301, a processor 302, and a storage 303, where the processor 302 is separately connected to the display screen 301 and the storage 303, the display screen 301 is configured to display a thumbnail, the processor 302 is configured to perform feature extraction on the thumbnail to obtain a feature factor of the thumbnail, and is configured to determine that the feature factor of the thumbnail is matched with a feature factor in a preset feature factor index library, the display screen 301 is further configured to display prompt information, where the prompt information indicates that an original image matching the thumbnail exists, and the display screen 301 is further configured to display the original image, and the storage 303 is configured to store the preset feature factor index library and the original image, where the feature factor index library indicates correspondences between feature factors and image storage addresses.

In a possible implementation of this embodiment of the present disclosure, the processor 302 is further configured to obtain the original image, perform feature extraction on the original image to obtain a feature factor of the original image, and update an initial feature factor index library based on the feature factor of the original image to obtain the preset feature factor index library.

In a possible implementation of the present disclosure, the processor 302 is configured to calculate a similarity value between the feature factor of the thumbnail and each feature factor in the feature factor index library, where if at least one of all the similarity values is not less than a preset threshold, the feature factor of the thumbnail is matched with the feature factor in the preset feature factor index library.

In a possible implementation of the present disclosure, the processor 302 is configured to display the original image based on an image storage address corresponding to a target feature factor, where in all the similarity values not less than the preset threshold, a feature factor corresponding to a largest similarity value is the target feature factor, and the target feature factor is in the preset feature factor index library.

For a specific implementation of the foregoing terminal embodiment, refer to a corresponding implementation of the foregoing method embodiment, and details are not described herein again.

An image format of the image described in this embodiment of the present disclosure may be JPEG, TIFF, RAW, BMP, GIF, PNG, or the like.

Figure 4:
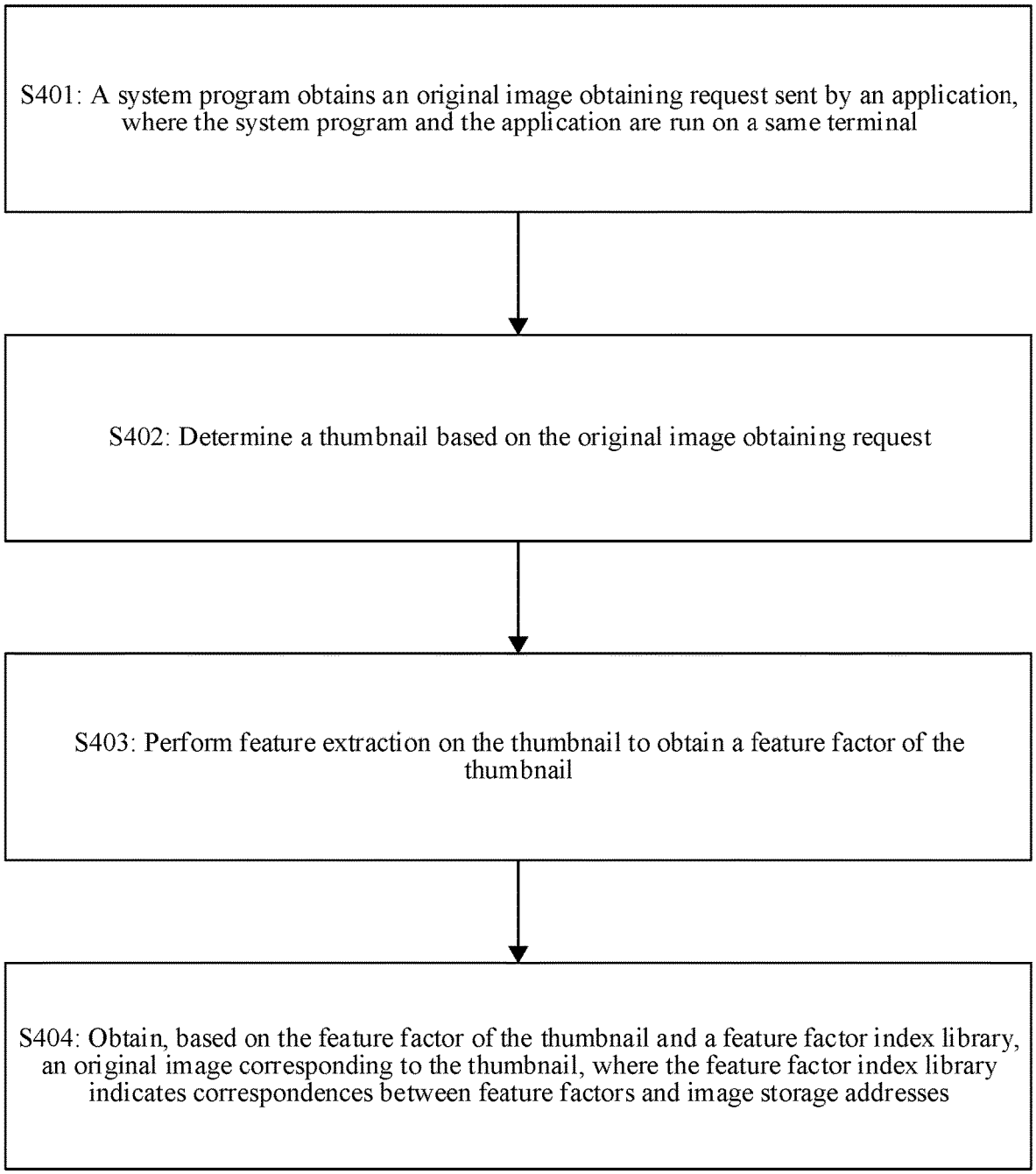
FIG. 4 is a flowchart of a method for implementing image display using a thumbnail according to an embodiment of the present disclosure.

As shown in FIG. 4, an embodiment of the third aspect of the present disclosure discloses a thumbnail-based image display method. The method includes the following steps.

Step S401: A system program obtains an original image obtaining request sent by an application, where the system program and the application are run on a same terminal.

In a possible implementation of the present disclosure, before step S401, the method further includes obtaining, by the system program, an original image, calculating, by the system program, a feature factor of the original image, and updating, by the system program, a feature factor index library based on a storage location of the original image and the feature factor of the original image.

In a possible implementation of the present disclosure, the system program obtains the original image. An original high-definition image may be obtained through capturing using a camera. Alternatively, an original high-definition image may be obtained through downloading from a server or another terminal using a wireless network (such as WI-FI, 3G network transmission, or 4G network transmission) or a wired network (such as an optical fiber). Alternatively, an original high-definition image may be obtained from another terminal through BLUETOOTH, NFC, or the like.

In a possible implementation of the present disclosure, the terminal herein may be a smartphone, a tablet computer, a notebook computer, a wearable device (such as a smartwatch or a smart band), or the like.

In a possible implementation of the present disclosure, the system program updates the feature factor index library by adding an index item.

In a possible implementation of the present disclosure, after updating a feature factor index library based on a storage location of the original image and the feature factor of the original image and before the obtaining an original image obtaining request sent by an application, the method further includes obtaining a thumbnail based on the original image, and sending the thumbnail to the application. In this implementation, an image can be conveniently shared between different applications, and especially when a plurality of images needs to be shared, transmission efficiency can be improved by sending thumbnails first.

Step S402: Determine a thumbnail based on the original image obtaining request.

In a possible implementation of the present disclosure, the original image obtaining request includes an identifier of the thumbnail, and the obtaining a thumbnail based on the original image obtaining request includes obtaining the thumbnail based on the identifier of the thumbnail.

In a possible implementation of the present disclosure, when the original image obtaining request includes the identifier of the thumbnail, the thumbnail may be determined by the application, or the thumbnail may be determined by the system program. Optionally, the system program may obtain, by directly accessing a memory or a buffer of the application, the thumbnail based on the identifier of the thumbnail. In this implementation, the obtaining request includes only the identifier of the thumbnail, thereby reducing an amount of transmitted data and improving the transmission efficiency. This implementation is relatively applicable to be used in a communications network transmission manner such as 3G or 4G.

In a possible implementation of the present disclosure, the determining a thumbnail based on the original image obtaining request includes parsing the original image obtaining request, to obtain the thumbnail. In this implementation, the original image obtaining request includes thumbnail data such that the thumbnail does not need to be obtained in a searching and matching manner. An advantage is that searching and calculation of a receive end are reduced, and a disadvantage is that there is a relatively large amount of transmitted data. This implementation is relatively applicable to be used in a transmission manner such as WI-FI or BLUETOOTH transmission.

Step S403: Perform feature extraction on the thumbnail to obtain a feature factor of the thumbnail.

In a possible implementation of the present disclosure, the feature factor of the thumbnail includes a color feature, a texture feature, a shape feature, or a spatial relationship feature.

Step S404: Obtain, based on the feature factor of the thumbnail and a feature factor index library, an original image corresponding to the thumbnail, where the feature factor index library indicates correspondences between feature factors and image storage addresses.

In a possible implementation of the present disclosure, the feature factor and the image address are in a one-to-one correspondence, and obtaining, based on the feature factor of the thumbnail and a feature factor index library, an original image corresponding to the thumbnail includes obtaining the original image based on a target feature factor, where the target feature factor is a feature factor that is in the feature factor index library and whose absolute value of a difference from the feature factor of the thumbnail is the smallest. Usually, comparison between different feature factors is represented using a similarity value. For a manner of obtaining the original image based on the similarity value, refer to the following embodiments. However, in an absolute difference value manner provided in this embodiment, calculation is relatively simple such that calculation resources of the terminal can be saved, thereby improving calculation efficiency. It can be understood that applications of this embodiment do not include a case in which the feature factor is represented using a vector. In this case, a difference between feature factors cannot be directly calculated.

In a possible implementation of the present disclosure, obtaining, based on the feature factor of the thumbnail and a feature factor index library, an original image corresponding to the thumbnail includes obtaining the original image based on a target feature factor, where the target feature factor is a feature factor that is in the feature factor index library and whose similarity value with the feature factor of the thumbnail is not less than a preset threshold.

In this embodiment of the present disclosure, a method provided in the other approaches may be used to calculate the similarity value between feature factors after the feature factor of the thumbnail is extracted. In a possible implementation, a Euclidean distance that can use a key point feature vector may be calculated as a similarity value between key points in two images.

In a possible implementation of the present disclosure, global or local similarity calculation is performed in the index library using an index value of the thumbnail, a threshold is set based on required robustness, then images with high similarities are pre-stored, and then an optimal matching image is sifted out as the original image.

In this embodiment of the present disclosure, the original image may be directly sent to the application, or a storage address of the original image may be sent to the application.

In this embodiment of the present disclosure, after obtaining the original image, the application may perform another operation such as viewing, editing, or sharing on the original image.

According to the image sharing method in this embodiment of the present disclosure, indexes are established for images in memories and buffers of all applications and in an image library in a mobile phone such that cross-application image display can be implemented. Further, an original high-definition image whose image content is the same as or similar to that of a thumbnail may be found using the thumbnail, thereby viewing, editing, and sharing the original high-definition image.

Figure 5:
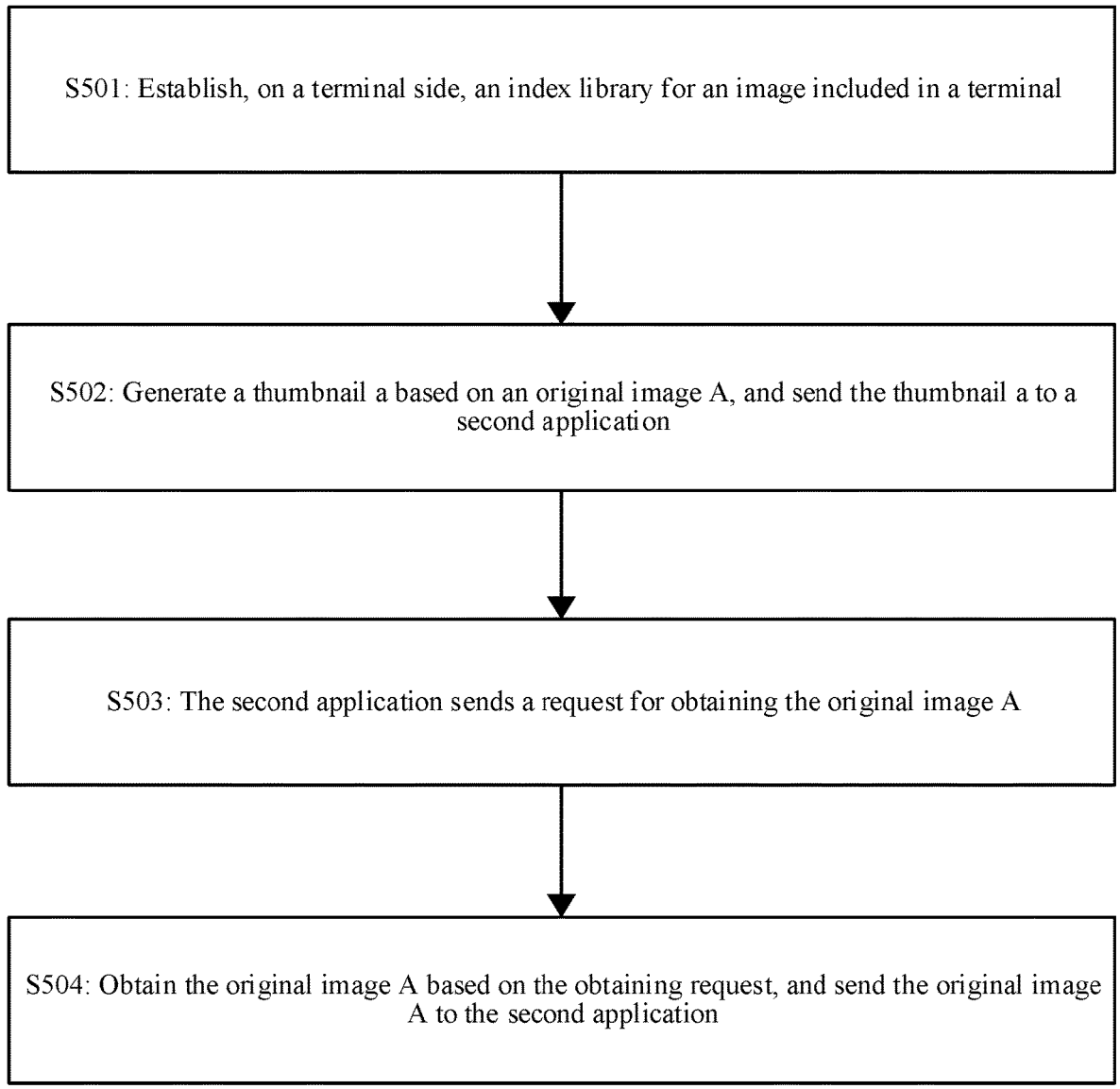
FIG. 5 is a flowchart of another method for implementing image display using a thumbnail according to an embodiment of the present disclosure.

An embodiment of the present disclosure discloses a cross-application thumbnail-based image display method. As shown in FIG. 5, the method includes the following steps.

Step S501: Establish, on a terminal side, a feature factor index library for an image included in a terminal.

The image included in the terminal may include an image included in a storage, images stored in memories or buffers of all applications, an image stored in a memory or a buffer of a system program, and the like. This is not limited.

In a possible implementation of the present disclosure, the index library is automatically established and updated. For example, the terminal may choose to update the index library at a fixed time (twelve o'clock every night) or a fixed period (every two weeks), or may update the index library when being triggered by an event (for example, a mobile phone is asleep). An update manner includes index item addition, index item update, and index item deletion. An object of the index item addition is a newly stored image within an update period, an object of the index item update is an image whose storage location is changed within the update period, and an object of the index item deletion is an image removed from the terminal within the update period. Because the update of the index library requires consumption of a system calculation resource. In a possible manner, the index library may be updated in a combined manner of the time manner and the event triggering manner. For example, after twelve o'clock at night, the terminal updates the index library only when the terminal is in a sleep state. This update manner does not affect normal use of the terminal by a user.

In a possible implementation of the present disclosure, a user autonomously chooses to establish and update the index library. In this manner, the user may select an update time and an update range (for example, which applications are selected to be updated) for the index library based on a requirement. It should be noted that the foregoing two update manners (automatic system update and manual user update) may be used together and do not conflict with each other, and simultaneous use of the two update manners can improve processing flexibility.

In a possible implementation of the present disclosure, resolution of the image is compared with a threshold first, and when the resolution of the image is not less than or is equal to the preset threshold, an index is established for the image. When resolution of the image is less than the threshold, no index is established for the image. For some images with relatively low resolution, a visual quality difference between the original image and the thumbnail is not very large such that an index of the original image may not need to be established, thereby saving calculation resources. The preset threshold may be 300 pixels, 400 pixels, 450 pixels, or the like.

In a possible implementation of the present disclosure, one or more feature factors of each image are obtained by performing feature extraction on the image, and then the index library is obtained based on the feature factor of each image. FIG. 6 lists a possible representation of the index library.

In a possible implementation of the present disclosure, the feature factor includes a color feature, a texture feature, a shape feature, or a spatial relationship feature.

There are a lot of algorithms of calculating a feature factor of an image. The algorithms may be, for example, an ORB feature, a SIFT descriptor, a fingerprint algorithm function, a bundling features algorithm, a hash function, and a deep network feature. Alternatively, an image feature may be extracted by designing different algorithms based on different images, for example, an image local N-order moment method.

In a possible implementation, image feature information obtained after the extraction may be encoded, and the index library is established based on encoded image feature information. For a target image, down-sampling may be performed on an image with relatively high resolution, and image feature extraction and encoding processing are performed after a calculation amount is reduced.

Step S502: Generate a thumbnail a based on an original image A, and send the thumbnail a to a second application.

In a possible implementation of the present disclosure, the system program generates the thumbnail a based on the original image A. In a possible implementation of the present disclosure, a first application generates the thumbnail a based on the original image A.

In a possible implementation of the present disclosure, the first application and the second application are run on a same terminal. For example, the first application and the second application are run on a same smartphone.

In a possible implementation of the present disclosure, the first application and the second application are run on different terminals. For example, the first application is run on a smartphone, and the second application is run on another smartphone.

The application in this embodiment of the present disclosure may be a computer program that is run on an operating system and that completes one or more particular tasks, for example, a program that is run on a mobile operating system such as ANDROID or IOS or a computer operating system such as WINDOWS or LINUX and that completes a particular task.

Further, the application in this embodiment of the present disclosure may include social software, email service software, multi-media editing software, analysis software, collaboration software, or the like.

In a possible implementation, the application is installed on the terminal. In another possible implementation, the application is a network program run on the terminal side.

Step S503: The second application sends a request for obtaining the original image A.

In a possible implementation of the present disclosure, the second application sends the obtaining request to the first application. In this case, the obtaining request is processed by the first application.

In a possible implementation of the present disclosure, the second application sends the obtaining request to a terminal on which the first application is run. In this case, the obtaining request may be processed by the first application, or may be processed by the system program of the terminal.

Step S504: Obtain the original image A based on the obtaining request, and send the original image A to the second application.

In this embodiment of the present disclosure, the corresponding thumbnail a is determined based on the obtaining request, a feature factor is extracted from the thumbnail a, then retrieval is performed in the index library based on the feature factor, and the retrieved original image A is sent to the second application.

In this embodiment of the present disclosure, determining the corresponding thumbnail a based on the obtaining request may include the following implementations.

1. The second application directly sends the thumbnail a to the first application, or 2. the second application sends a sequence number value of the thumbnail a to the terminal on which the first application is run, and the terminal on which the first application is run determines the thumbnail a based on the received sequence number value.

In this embodiment of the present disclosure, for extraction of the feature factor from the thumbnail a, refer to the foregoing operation manner of extracting the feature factor from the image, and details are not described herein again.

In this embodiment of the present disclosure, performing retrieval in the index library based on the extracted feature factor of the thumbnail a may include the following implementations.

An absolute difference value between the feature factor of the thumbnail a and a feature factor of an image in the index library is calculated. The absolute difference value is an absolute value of a difference. An image corresponding to a feature factor whose absolute difference value from the feature factor of the thumbnail a is the smallest is determined as the retrieved original image.

A similarity value between the feature factor of the thumbnail a and a feature factor of an image in the index library is calculated, and when the similarity value is not less than a threshold, the image corresponding to the feature factor is determined as the original image.

In this embodiment of the present disclosure, a method provided in the other approaches may be used to calculate the similarity value between feature factors after the feature factor of the image is extracted. In a possible implementation, a Euclidean distance that can use a key point feature vector may be calculated as a similarity value between key points in two images.

In a possible implementation of the present disclosure, global or local similarity calculation is performed in the index library using an index value of the thumbnail, a threshold is set based on required robustness, then images with high similarities are pre-stored, and then an optimal matching image is sifted out as the original image A.

In this embodiment of the present disclosure, the original image A may be directly sent to the second application, or a storage address of the original image A may be sent to the second application.

In this embodiment of the present disclosure, after obtaining the original image A, the second application may perform another operation such as viewing, editing, or sharing on the original image A.

According to the image sharing method in this embodiment of the present disclosure, indexes are established for images in memories and buffers of all applications and in an image library in a mobile phone such that cross-application image display can be implemented. Further, an original high-definition image whose image content is the same as or similar to that of a thumbnail may be found using the thumbnail, thereby viewing, editing, and sharing the original high-definition image.

An embodiment of the fourth aspect of the present disclosure discloses a thumbnail-based image display terminal. The terminal includes a receiver configured to receive an original image obtaining request sent by another terminal, and a processor configured to determine a thumbnail based on the original image obtaining request, where the processor is further configured to perform feature extraction on the thumbnail, to obtain a feature factor of the thumbnail, and the processor is further configured to obtain, based on the feature factor of the thumbnail and a feature factor index library, an original image corresponding to the thumbnail, where the feature factor index library indicates correspondences between feature factors and image storage addresses.

In a possible implementation of the present disclosure, the processor is further configured to obtain the thumbnail based on the identifier of the thumbnail, where the original image obtaining request includes an identifier of the thumbnail, perform feature extraction on the thumbnail, to obtain the feature factor of the thumbnail, and obtain, based on the feature factor of the thumbnail and the feature factor index library, the original image corresponding to the thumbnail, where the feature factor index library indicates the correspondences between the feature factors and the image storage addresses.

In a possible implementation of the present disclosure, the processor is further configured to parse the original image obtaining request, to obtain the thumbnail, perform feature extraction on the thumbnail, to obtain the feature factor of the thumbnail, and obtain, based on the feature factor of the thumbnail and the feature factor index library, the original image corresponding to the thumbnail, where the feature factor index library indicates the correspondences between the feature factors and the image storage addresses.

In a possible implementation of the present disclosure, the feature factor of the thumbnail includes a color feature, a texture feature, a shape feature, or a spatial relationship feature.

In a possible implementation of the present disclosure, the processor is further configured to obtain the thumbnail based on the original image obtaining request, perform feature extraction on the thumbnail, to obtain the feature factor of the thumbnail, where the feature factor and the image address are in a one-to-one correspondence, determine a target feature factor, where the target feature factor is a feature factor that is in the feature factor index library and whose absolute value of a difference from the feature factor of the thumbnail is the smallest, and obtain the original image based on the target feature factor.

In a possible implementation of the present disclosure, the processor is further configured to obtain the thumbnail based on the original image obtaining request, perform feature extraction on the thumbnail, to obtain the feature factor of the thumbnail, determine a target feature factor, where the target feature factor is a feature factor that is in the feature factor index library and whose similarity value with the feature factor of the thumbnail is not less than a preset threshold, and obtain the original image based on the target feature factor.

In a possible implementation of the present disclosure, the receiver is further configured to obtain the original image, the processor is further configured to calculate a feature factor of the original image, and the processor is further configured to update the feature factor index library based on a storage location of the original image and the feature factor of the original image.

For a specific implementation of the foregoing terminal embodiment, refer to a corresponding implementation of the foregoing method embodiments, and details are not described herein again.

According to the image sharing terminal in this embodiment of the present disclosure, indexes are established for images in memories and buffers of all applications and in an image library in a mobile phone such that cross-application image display can be implemented. Further, an original high-definition image whose image content is the same as or similar to that of a thumbnail may be found using the thumbnail, thereby viewing, editing, and sharing the original high-definition image.

A method for thumbnail-based image sharing between different applications on a same terminal according to an embodiment of the present disclosure is described below with reference to FIG. 7.

Figure 7:
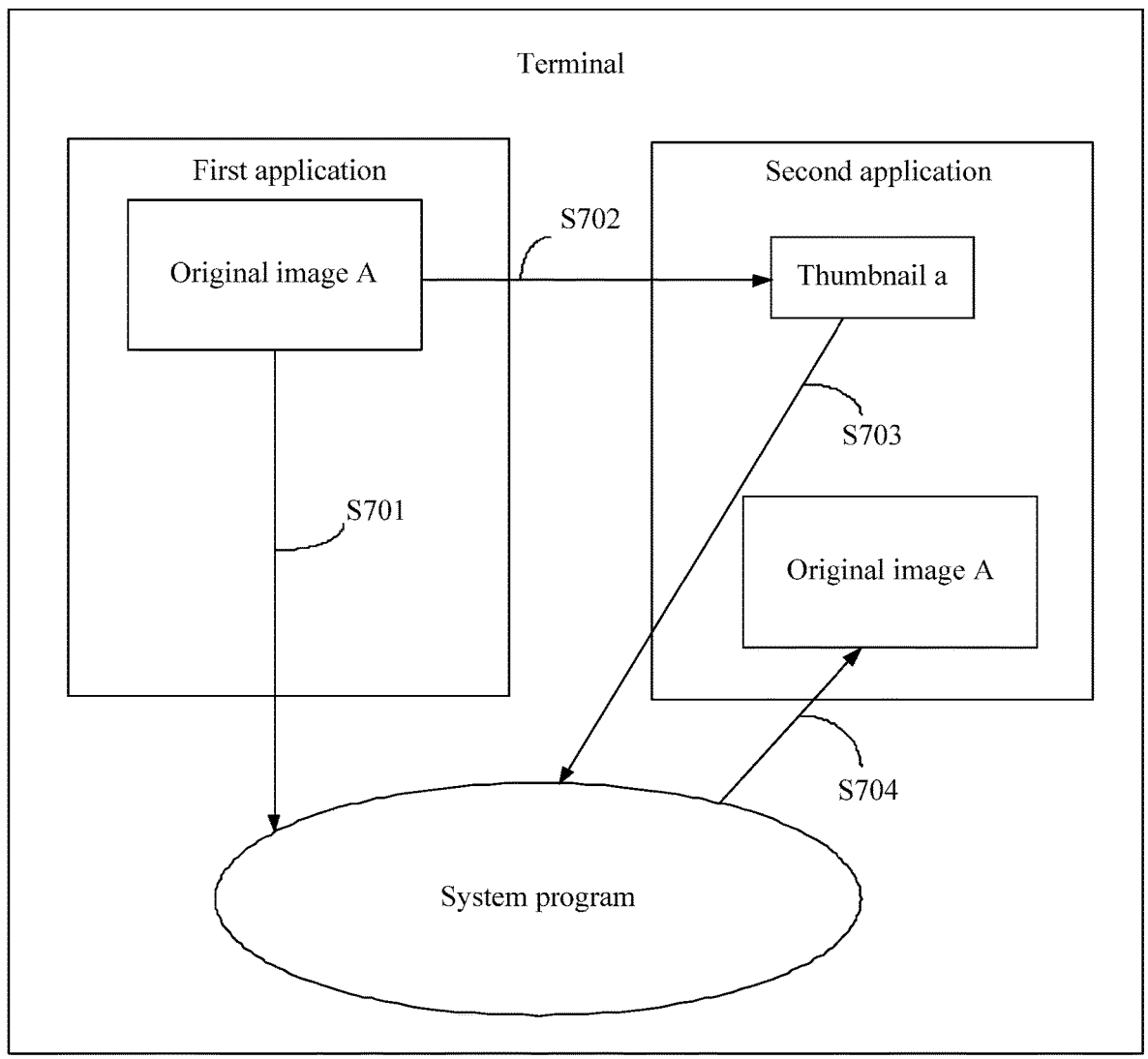
FIG. 7 is a schematic diagram of a method for implementing image display on a same terminal according to an embodiment of the present disclosure.

As shown in FIG. 7, the method includes the following steps.

Step S701: Add an original image A to an index library.

When obtaining a new original image A, a terminal may add a feature factor of the original image A to the index library in the manner of step S501 in FIG. 5, and details are not described herein again.

Step S702: Obtain a thumbnail a based on the original image A, and send the thumbnail a to a second application.

In an implementation of the present disclosure, generating a thumbnail a based on the original image A may be performed by a first application. In this case, the thumbnail a may be stored in a buffer or a memory corresponding to the first application.

In an implementation of the present disclosure, generating a thumbnail a based on the original image A may be performed by a system program. In this case, the thumbnail a is stored in a buffer, a memory, or a storage specified by the system program.

In an implementation of the present disclosure, a plurality of processes may be run between a system program and an application. In this case, the generating a thumbnail a based on the original image A is performed by these processes. In an implementation of the present disclosure, the thumbnail a is obtained by down-sampling or cutting the original image A.

Step S703: The second application sends a request for obtaining the original image A.

The second application sends the request for obtaining the original image corresponding to the thumbnail to the system program. Because the first application and the second application are run on a same terminal, processing efficiency can be improved by directly sending the request to the system program herein. In a possible implementation, the obtaining request may alternatively be sent to the first application.

In a possible implementation of the present disclosure, the obtaining request includes a sequence number value of the thumbnail a, the system program determines the thumbnail a based on the sequence number value, then feature extraction is performed on the thumbnail a, and the original image A is determined based on an extracted feature factor of the thumbnail a.

In a possible implementation of the present disclosure, the obtaining request may alternatively directly include the thumbnail a. In this case, feature extraction may be directly performed on the thumbnail a, and the original image A is determined based on an extracted feature factor of the thumbnail a.

In this embodiment of the present disclosure, for extraction of the feature factor from the thumbnail a, refer to the foregoing operation manner of extracting the feature factor from the image, and details are not described herein again.

In this embodiment of the present disclosure, performing retrieval in the index library based on the extracted feature factor of the thumbnail a may include the following implementations.

An absolute difference value between the feature factor of the thumbnail a and a feature factor of an image in the index library is calculated. The absolute difference value is an absolute value of a difference. An image corresponding to a feature factor whose absolute difference value from the feature factor of the thumbnail a is the smallest is determined as the retrieved original image.

A similarity value between the feature factor of the thumbnail a and a feature factor of an image in the index library is calculated, and when the similarity value is not less than a threshold, the image corresponding to the feature factor is determined as the original image.

In this embodiment of the present disclosure, a method provided in the other approaches may be used to calculate the similarity value between feature factors after the feature factor of the image is extracted. In a possible implementation, a Euclidean distance that can use a key point feature vector may be calculated as a similarity value between key points in two images.

In a possible implementation of the present disclosure, global or local similarity calculation is performed in the index library using an index value of the thumbnail, a threshold is set based on required robustness, then images with high similarities are pre-stored, and then an optimal matching image is sifted out as the original image A.

Step S704: Send the original image A to the second application.

In this embodiment of the present disclosure, the original image A may be directly sent to the second application, or a storage address of the original image A may be sent to the second application.

In this embodiment of the present disclosure, after obtaining the original image A, the second application may perform another operation such as viewing, editing, or sharing on the original image A.

According to the image sharing method in this embodiment of the present disclosure, indexes are established for images in memories and buffers of all applications and in an image library in a mobile phone such that cross-application image display can be implemented. Further, an original high-definition image whose image content is the same as or similar to that of a thumbnail may be found using the thumbnail, thereby viewing, editing, and sharing the original high-definition image.

A method for thumbnail-based image sharing between different applications on different terminals according to an embodiment of the present disclosure is described below with reference to FIG. 8.

Figure 8:
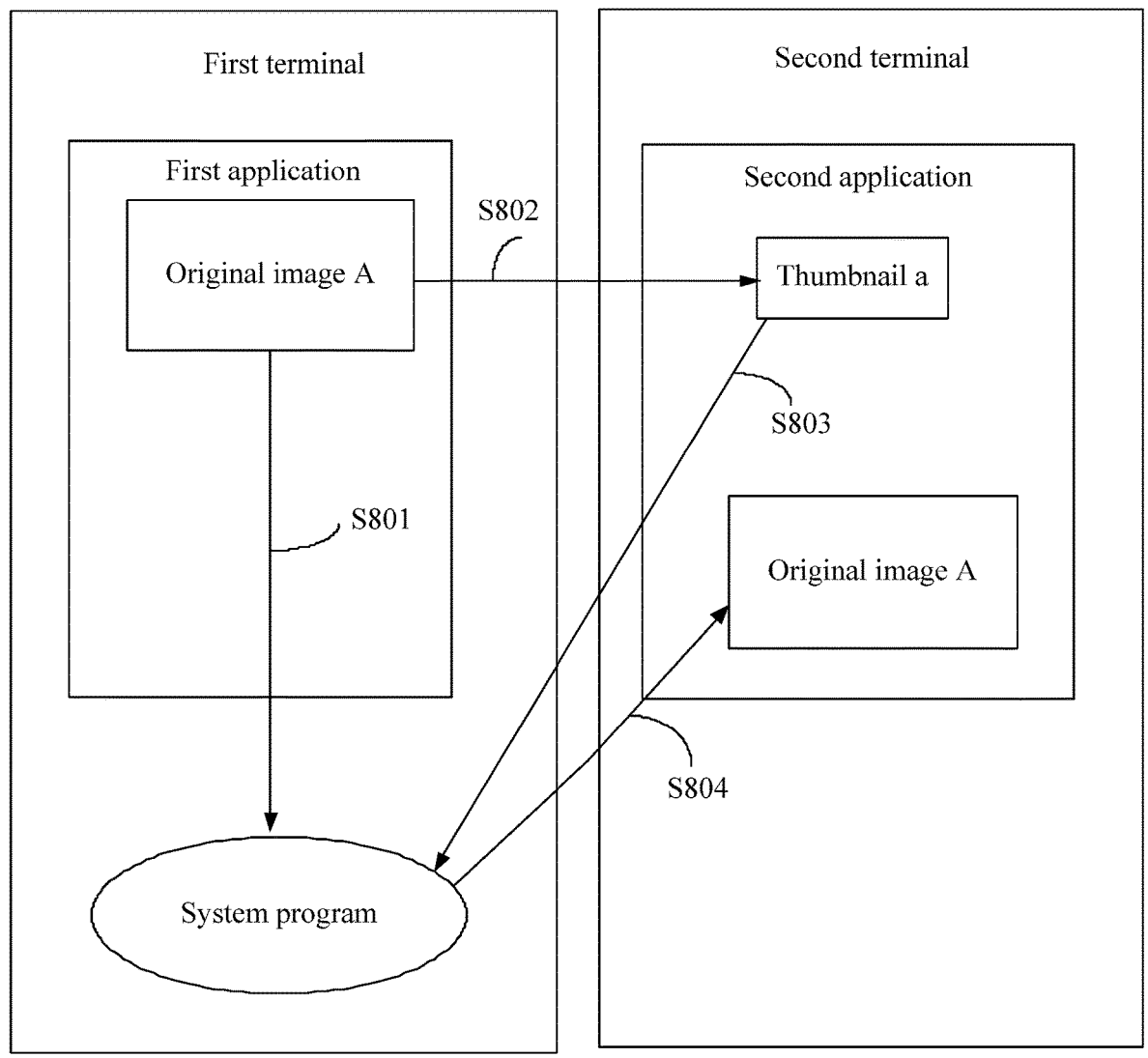
FIG. 8 is a schematic diagram of a method for implementing image display on different terminals according to an embodiment of the present disclosure.

As shown in FIG. 8, the method includes the following steps.

Step S801: Add an original image A to an index library.

When obtaining a new original image A, a terminal may add a feature factor of the original image A to the index library in the manner of step S501 in FIG. 5, and details are not described herein again.

Step S802: Obtain a thumbnail a based on the original image A, and send the thumbnail a to a second application.

In an implementation of the present disclosure, generating a thumbnail a based on the original image A may be performed by a first application. In this case, the thumbnail a may be stored in a buffer or a memory corresponding to the first application.

In an implementation of the present disclosure, generating a thumbnail a based on the original image A may be performed by a system program. In this case, the thumbnail a is stored in a buffer or a memory specified by the system program.

In an implementation of the present disclosure, a plurality of processes may be run between a system program and an application. In this case, generating a thumbnail a based on the original image A is performed by these processes.

In an implementation of the present disclosure, the thumbnail a is obtained by down-sampling or cutting the original image A.

Step S803: The second application sends a request for obtaining the original image A.

The second application sends a request for obtaining the original image corresponding to the thumbnail to a system program of a first terminal.

In a possible implementation of the present disclosure, the obtaining request includes a sequence number value of the thumbnail a, and the system program of the first terminal determines the thumbnail a based on the sequence number value.

In a possible implementation of the present disclosure, the first application and the second application are not on a same terminal, and the obtaining request may alternatively directly include the thumbnail a. Therefore, although some transmission costs are increased, processing efficiency of a first terminal side is improved.

Step S804: A system program of a first terminal determines the original image A, and sends the original image A to a second terminal.

In this embodiment of the present disclosure, a feature factor of the thumbnail a is obtained first. For extraction of the feature factor from the thumbnail a, refer to the foregoing operation manner of extracting the feature factor from the image, and details are not described herein again.

Then, the original image A is determined based on the feature factor of the thumbnail a and a feature factor index library. In this embodiment of the present disclosure, performing retrieval in the index library based on the extracted feature factor of the thumbnail a may include the following implementations.

An absolute difference value between the feature factor of the thumbnail a and a feature factor of an image in the index library is calculated. The absolute difference value is an absolute value of a difference. An image corresponding to a feature factor whose absolute difference value from the feature factor of the thumbnail a is the smallest is determined as the retrieved original image.

A similarity value between the feature factor of the thumbnail a and a feature factor of an image in the index library is calculated, and when the similarity value is not less than a threshold, the image corresponding to the feature factor is determined as the original image.

In this embodiment of the present disclosure, a method provided in the other approaches may be used to calculate the similarity value between feature factors after the feature factor of the image is extracted. In a possible implementation, a Euclidean distance that can use a key point feature vector may be calculated as a similarity value between key points in two images.

In a possible implementation of the present disclosure, global or local similarity calculation is performed in the index library using an index value of the thumbnail, a threshold is set based on required robustness, then images with high similarities are pre-stored, and then an optimal matching image is sifted out as the original image A.

In this embodiment of the present disclosure, the system program of the first terminal may directly send the original image A to the second application, or may send a storage address of the original image A to the second application.

In this embodiment of the present disclosure, after obtaining the original image A, the second application may perform another operation such as viewing, editing, or sharing on the original image A.

According to the image sharing method in this embodiment of the present disclosure, indexes are established for images in memories and buffers of all applications and in an image library in a mobile phone such that cross-application image display can be implemented. Further, an original high-definition image whose image content is the same as or similar to that of a thumbnail may be found using the thumbnail, thereby viewing, editing, and sharing the original high-definition image.

A method for thumbnail-based image sharing between different applications on different terminals according to an embodiment of the present disclosure is described below with reference to FIG. 9.

Figure 9:
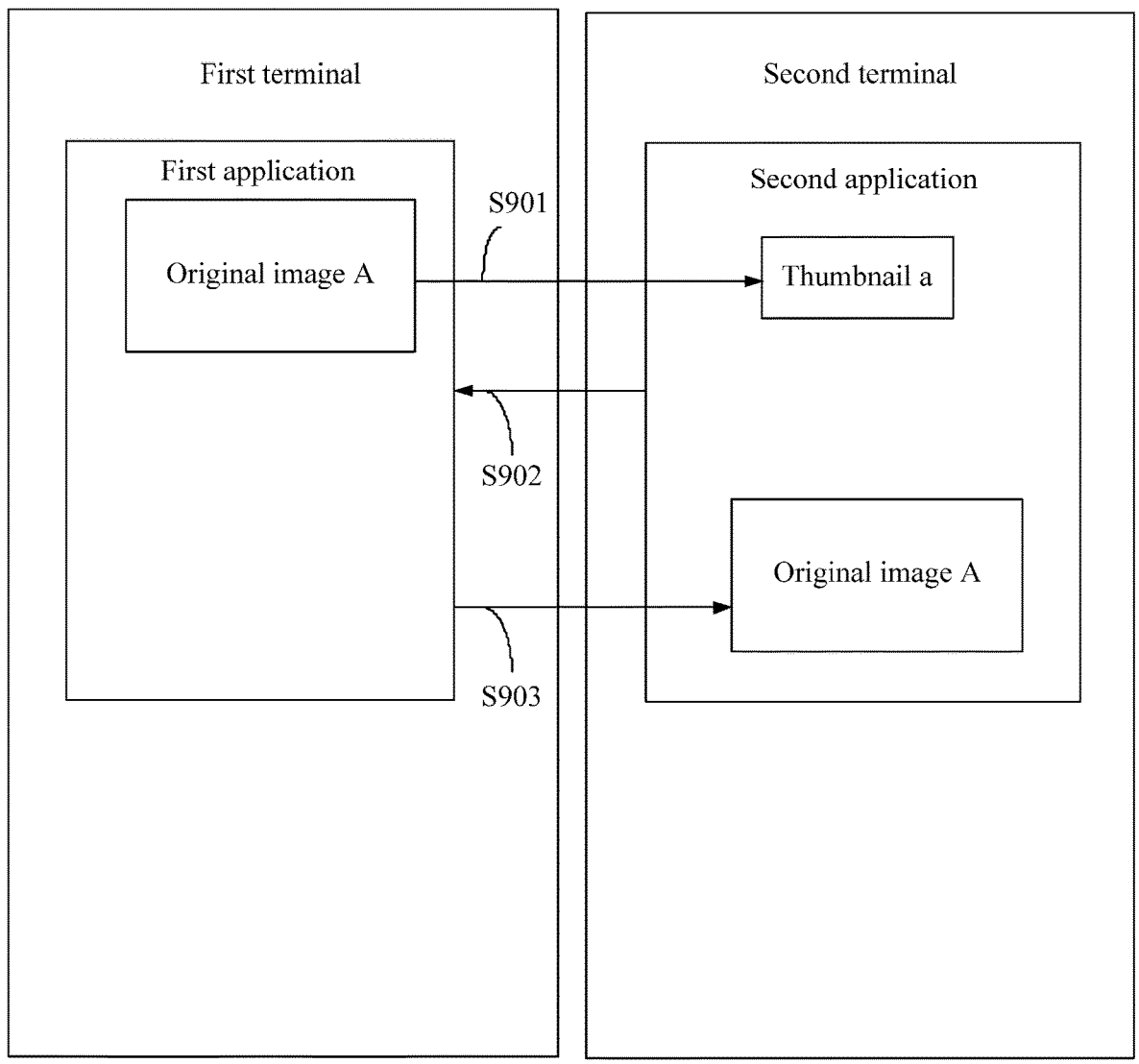
FIG. 9 is a schematic diagram of a method for implementing image display on different terminals according to an embodiment of the present disclosure.

As shown in FIG. 9, the method includes the following steps.

Step S901: Obtain a thumbnail a based on an original image A, and send the thumbnail a to a second application.

In an implementation of the present disclosure, the generating a thumbnail a based on an original image A may be performed by a first application. In this case, the thumbnail a may be stored in a buffer or a memory corresponding to the first application.

In an implementation of the present disclosure, generating a thumbnail a based on an original image A may be performed by a system program. In this case, the thumbnail a is stored in a buffer or a memory specified by the system program.

In an implementation of the present disclosure, a plurality of processes may be run between a system program and an application. In this case, generating a thumbnail a based on an original image A is performed by these processes.

In an implementation of the present disclosure, the thumbnail a is obtained by down-sampling or cutting the original image A.

Step S902: The second application sends a request for obtaining the original image A.

The second application sends a request for obtaining the original image corresponding to the thumbnail to the first application.

In a possible implementation of the present disclosure, the obtaining request includes a sequence number value of the thumbnail a, and the first application determines the thumbnail a based on the sequence number value.

In a possible implementation of the present disclosure, the first application and the second application are not on a same terminal, and the obtaining request may alternatively directly include the thumbnail a. Therefore, although some transmission costs are increased, processing efficiency of a first terminal side is improved.

Step S903: Determine the original image A, and send the original image A to a second terminal.

In this embodiment of the present disclosure, a feature factor of the thumbnail a is obtained first. For extraction of the feature factor from the thumbnail a, refer to the foregoing operation manner of extracting the feature factor from the image, and details are not described herein again.

Then, the original image A is determined based on the feature factor of the thumbnail a and a feature factor index library. In this embodiment of the present disclosure, performing retrieval in the index library based on the extracted feature factor of the thumbnail a may include the following implementations.

An absolute difference value between the feature factor of the thumbnail a and a feature factor of an image in the index library is calculated. The absolute difference value is an absolute value of a difference. An image corresponding to a feature factor whose absolute difference value from the feature factor of the thumbnail a is the smallest is determined as the retrieved original image.

A similarity value between the feature factor of the thumbnail a and a feature factor of an image in the index library is calculated, and when the similarity value is not less than a threshold, the image corresponding to the feature factor is determined as the original image.

In this embodiment of the present disclosure, a method provided in the other approaches may be used to calculate the similarity value between feature factors after the feature factor of the image is extracted. In a possible implementation, a Euclidean distance that can use a key point feature vector may be calculated as a similarity value between key points in two images.

In a possible implementation of the present disclosure, global or local similarity calculation is performed in the index library using an index value of the thumbnail, a threshold is set based on required robustness, then images with high similarities are pre-stored, and then an optimal matching image is sifted out as the original image A.

In this embodiment of the present disclosure, the original image A may be directly sent to the second application, or a storage address of the original image A may be sent to the second application.

In this embodiment of the present disclosure, after obtaining the original image A, the second application may perform another operation such as viewing, editing, or sharing on the original image A.

According to the image sharing method in this embodiment of the present disclosure, indexes are established for images in memories and buffers of all applications and in an image library in a mobile phone such that cross-application image display can be implemented. Further, an original high-definition image whose image content is the same as or similar to that of a thumbnail may be found using the thumbnail, thereby viewing, editing, and sharing the original high-definition image.

Figure 10:
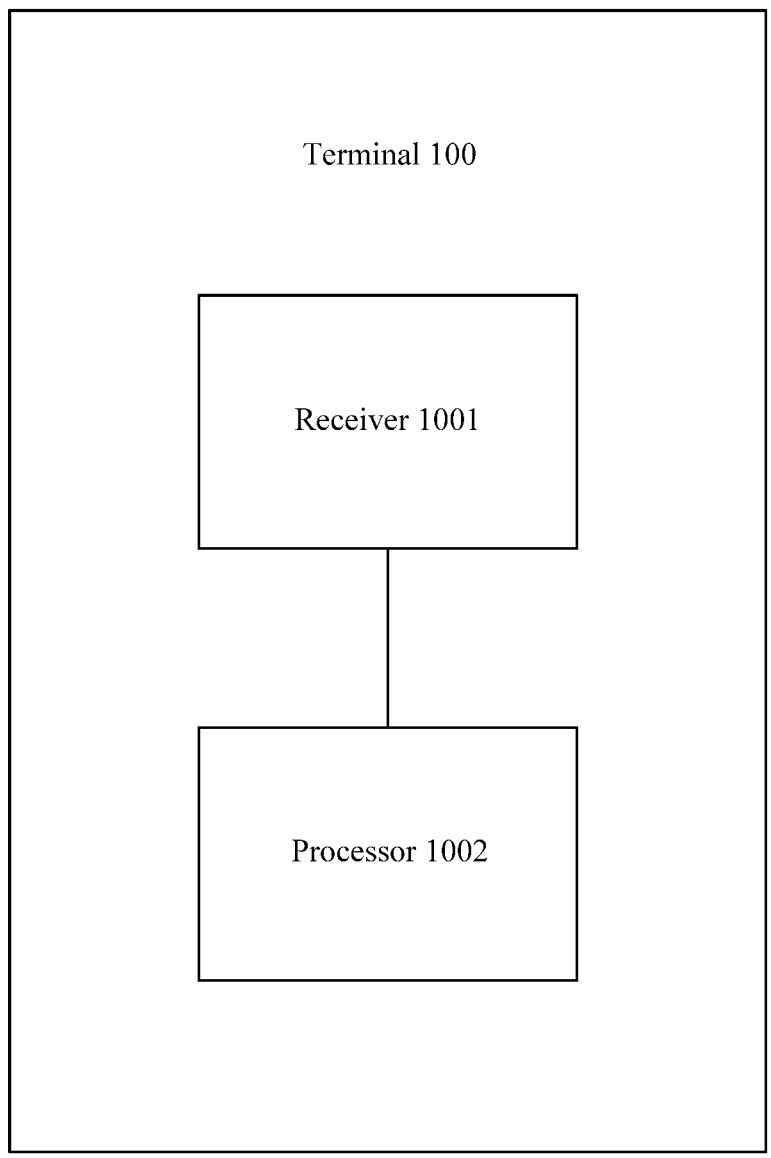
FIG. 10 is a structural diagram of a terminal for implementing image display according to an embodiment of the present disclosure.

A thumbnail-based image display terminal 100 according to an embodiment of the present disclosure is described below with reference to FIG. 10. The terminal 100 includes a receiver 1001 configured to receive an original image obtaining request sent by another terminal, and a processor 1002 configured to determine a thumbnail based on the original image obtaining request, where the processor 1002 is further configured to perform feature extraction on the thumbnail to obtain a feature factor of the thumbnail, and the processor 1002 is further configured to obtain, based on the feature factor of the thumbnail and a feature factor index library, an original image corresponding to the thumbnail, where the feature factor index library indicates correspondences between feature factors and image storage addresses.

In a possible implementation of the present disclosure, the processor 1002 is further configured to obtain the thumbnail based on the identifier of the thumbnail, where the original image obtaining request includes an identifier of the thumbnail, perform feature extraction on the thumbnail, to obtain the feature factor of the thumbnail, and obtain, based on the feature factor of the thumbnail and the feature factor index library, the original image corresponding to the thumbnail, where the feature factor index library indicates the correspondences between the feature factors and the image storage addresses.

In a possible implementation of the present disclosure, the processor 1002 is further configured to parse the original image obtaining request to obtain the thumbnail, perform feature extraction on the thumbnail to obtain the feature factor of the thumbnail, and obtain, based on the feature factor of the thumbnail and the feature factor index library, the original image corresponding to the thumbnail, where the feature factor index library indicates the correspondences between the feature factors and the image storage addresses.

In a possible implementation of the present disclosure, the feature factor of the thumbnail includes a color feature, a texture feature, a shape feature, or a spatial relationship feature.

In a possible implementation of the present disclosure, the processor 1002 is further configured to obtain the thumbnail based on the original image obtaining request, perform feature extraction on the thumbnail to obtain the feature factor of the thumbnail, where the feature factor and the image address are in a one-to-one correspondence, determine a target feature factor, where the target feature factor is a feature factor that is in the feature factor index library and whose absolute value of a difference from the feature factor of the thumbnail is the smallest, and obtain the original image based on the target feature factor.

In a possible implementation of the present disclosure, the processor 1002 is further configured to obtain the thumbnail based on the original image obtaining request, perform feature extraction on the thumbnail to obtain the feature factor of the thumbnail, determine a target feature factor, where the target feature factor is a feature factor that is in the feature factor index library and whose similarity value with the feature factor of the thumbnail is not less than a preset threshold, and obtain the original image based on the target feature factor.

In a possible implementation of the present disclosure, the receiver 1001 is further configured to obtain the original image, the processor 1002 is further configured to calculate a feature factor of the original image, and the processor 1002 is further configured to update the feature factor index library based on a storage location of the original image and the feature factor of the original image.

For a specific implementation of the foregoing terminal embodiment, refer to a corresponding implementation of the foregoing method embodiments, and details are not described herein again.

It should be noted that, for brief description, the foregoing method embodiments are represented as a series of actions. However, a person skilled in the art should appreciate that the present disclosure is not limited to the described order of the actions, because according to the present disclosure, some steps may be performed in another order or performed simultaneously. In addition, a person skilled in the art should also appreciate that all the embodiments described in this specification are preferred embodiments, and the related actions and modules are not necessarily mandatory to the present disclosure.

Content such as information exchange and an execution process between the modules in the apparatus and the system is based on a same idea as the method embodiments of the present disclosure. Therefore, for details, refer to descriptions in the method embodiments of the present disclosure, and details are not described herein again.

A person of ordinary skill in the art may understand that all or some of the processes of the methods in the embodiments may be implemented by a computer program instructing relevant hardware. The program may be stored in a computer readable storage medium. When the program is run, the processes of the methods in the embodiments are performed. The relevant hardware includes a processor. The foregoing storage medium may be a magnetic disk, an optical disc, a read-only memory (ROM), or a random access memory (RAM).

Specific examples are used in this specification to describe the principle and implementations of the present disclosure. The descriptions of the foregoing embodiments are merely intended to help understand the method and idea of the present disclosure. In addition, a person of ordinary skill in the art may make modifications to the specific implementations and the application scope according to the present disclosure. Therefore, content of this specification shall not be construed as a limitation to the present disclosure.

What is claimed is:
1. A thumbnail-based image display method, comprising:
 displaying a thumbnail on a screen of an image display terminal;
 performing feature extraction on the thumbnail to obtain a feature factor of the thumbnail;

displaying prompt information on the screen when the feature factor of the thumbnail is matched with a feature factor of an original image in a feature factor index library, wherein the feature factor index library is established on the image display terminal according to a plurality of original images including the original image included in the image display terminal, and indicates correspondences among feature factors and image storage addresses of the original images, wherein the prompt information indicates that the original image matching the thumbnail exists, and wherein matching the feature factor of the thumbnail with the feature factor in the feature factor index library comprises:
  calculating a similarity value between the feature factor of the thumbnail and each feature factor in the feature factor index library; and
  matching the feature factor of the thumbnail with the feature factor in the feature factor index library when at least one of all similarity values is greater than or equal to a preset threshold;
obtaining an original image obtaining request; and
displaying the original image on the screen based on the original image obtaining request.

2. The thumbnail-based image display method of claim 1, wherein before displaying the thumbnail on the screen, the thumbnail-based image display method further comprises:
  obtaining the original image;
  performing the feature extraction on the original image to obtain the feature factor of the original image; and
  updating an initial feature factor index library based on the feature factor of the original image to obtain the feature factor index library.

3. The thumbnail-based image display method of claim 1, wherein the feature factor of the thumbnail comprises a color feature, a texture feature, a shape feature, or a spatial relationship feature.

4. The thumbnail-based image display method of claim 1, wherein the thumbnail is a down-sampled image of the original image or an image obtained after the original image is cut.

5. The thumbnail-based image display method of claim 1, wherein displaying the original image on the screen comprises displaying the original image based on an image storage address corresponding to a target feature factor, wherein a feature factor corresponding to a largest similarity value in all similarity values greater than or equal to the preset threshold is the target feature factor, and wherein the target feature factor is in the feature factor index library.

6. An image display terminal, comprising:
  a display screen configured to display a thumbnail;
  a processor coupled to the display screen and configured to:
    perform feature extraction on the thumbnail to obtain a feature factor of the thumbnail; and
    determine that the feature factor of the thumbnail is matched with a feature factor of an original image in a feature factor index library, wherein in a manner to determine that the feature factor of the thumbnail is matched with the feature factor of the original image in a feature factor index library, the processor is further configured to:
      calculate a similarity value between the feature factor of the thumbnail and each feature factor in the feature factor index library; and
      match the feature factor of the thumbnail with the feature factor in the feature factor index library when at least one of all similarity values is greater than or equal to a preset threshold,
  wherein the display screen is further configured to:
    display prompt information, wherein the prompt information indicates that the original image matching the thumbnail exists; and
    display the original image; and
  a storage coupled to the processor and configured to store the feature factor index library and the original image, wherein the feature factor index library is established on the image display terminal according to a plurality of original images including the original image included in the image display terminal, and indicates correspondences among feature factors and image storage addresses of the original images.

7. The image display terminal of claim 6, wherein the processor is further configured to:
  obtain the original image;
  perform the feature extraction on the original image to obtain the feature factor of the original image; and
  update an initial feature factor index library based on the feature factor of the original image to obtain the feature factor index library.

8. The image display terminal of claim 6, wherein the processor is further configured to display, using the display screen, the original image based on an image storage address corresponding to a target feature factor, wherein a feature factor corresponding to a largest similarity value in all similarity values greater than or equal to the preset threshold is the target feature factor, and wherein the target feature factor is in the feature factor index library.

9. A thumbnail-based image display method, comprising:
  obtaining, using a system program, an original image obtaining request received from an application, wherein the system program and the application are running on a same image display terminal;
  obtaining a thumbnail based on the original image obtaining request;
  performing feature extraction on the thumbnail to obtain a feature factor of the thumbnail;
  calculating a similarity value between the feature factor of the thumbnail and each feature factor in a feature factor index library;
  matching the feature factor of the thumbnail with the feature factor in the feature factor index library when at least one of all similarity values is greater than or equal to a preset threshold;
  obtaining, based on the feature factor of the thumbnail and the feature factor index library, an original image corresponding to the thumbnail, wherein the feature factor index library is established on the terminal according to a plurality of original images including the original image included in the image display terminal, and indicates correspondences among feature factors and image storage addresses of the original images; and
  sending the original image to the application.

10. The thumbnail-based image display method of claim 9, wherein the original image obtaining request comprises an identifier of the thumbnail, and wherein obtaining the thumbnail based on the original image obtaining request comprises obtaining the thumbnail based on the identifier of the thumbnail.

11. The thumbnail-based image display method of claim 9, wherein obtaining the thumbnail based on the original image obtaining request comprises parsing the original image obtaining request to obtain the thumbnail.

12. The thumbnail-based image display method of claim 9, wherein obtaining the original image corresponding to the thumbnail comprises obtaining the original image based on a target feature factor, and wherein the target feature factor is a feature factor in the feature factor index library whose similarity value with the feature factor of the thumbnail is greater than or equal to the preset threshold.

13. The thumbnail-based image display method of claim 9, wherein before obtaining the original image obtaining request received from the application, the thumbnail-based image display method further comprises:
    obtaining the original image;
    calculating a feature factor of the original image; and
    updating the feature factor index library based on a storage location of the original image and the feature factor of the original image.

14. A thumbnail-based image display terminal, comprising:
    a receiver configured to receive an original image obtaining request from another terminal; and
    a processor coupled to the receiver and configured to:
        obtain a thumbnail based on the original image obtaining request;
        perform feature extraction on the thumbnail to obtain a feature factor of the thumbnail;
        calculate a similarity value between the feature factor of the thumbnail and each feature factor in a feature factor index library;
        match the feature factor of the thumbnail with the feature factor in the feature factor index library when at least one of all similarity values is greater than or equal to a preset threshold;
        obtain, based on the feature factor of the thumbnail and the feature factor index library, an original image corresponding to the thumbnail, wherein the feature factor index library is established on the terminal according to a plurality of original images including the original image included in the image display terminal, and indicates correspondences among feature factors and image storage addresses of the original images; and
        send the original image to the other terminal in response to receiving the original image obtaining request.

15. The thumbnail-based image display terminal of claim 14, wherein the original image obtaining request comprises an identifier of the thumbnail, and wherein the processor is further configured to obtain the thumbnail based on the identifier of the thumbnail.

16. The thumbnail-based image display terminal of claim 14, wherein the processor is further configured to parse the original image obtaining request to obtain the thumbnail.

17. The thumbnail-based image display terminal of claim 14, wherein the processor is further configured to obtain the original image based on a target feature factor, and wherein the target feature factor is a feature factor in the feature factor index library whose similarity value with the feature factor of the thumbnail is greater than or equal to the preset threshold.

18. The thumbnail-based image display terminal of claim 14, wherein before receiving the original image obtaining request from the other terminal, the receiver is further configured to obtain the original image, and wherein the processor is further configured to:
    calculate a feature factor of the original image; and
    update the feature factor index library based on a storage location of the original image and the feature factor of the original image.

19. The thumbnail-based image display method of claim 1, further comprising updating the feature factor index library in a timely manner or an event triggering manner.

20. The thumbnail-based image display method of claim 9, further comprising updating the feature factor index library in a timely manner or an event triggering manner.

* * * * *